Dec. 26, 1967    C. T. DE WIT ET AL    3,360,312
BEARING FOR EVACUATED SPACE
Filed Feb. 17, 1966

INVENTORS
CORNELIS T. DE WIT
PETRUS VAN HOESEL
GERARDUS J. BOON
BY

AGENT

3,360,312
BEARING FOR EVACUATED SPACE
Cornelis Teunis de Wit, Petrus van Hoesel, and Gerardus Johannes Boon, Emmasingel, Eindhoven, Netherlands, assignors to North American Philips Company Inc., New York, N.Y., a corporation of Delaware
Filed Feb. 17, 1966, Ser. No. 528,265
Claims priority, application Netherlands, Mar. 30, 1965, 65—3,995
2 Claims. (Cl. 308—173)

ABSTRACT OF THE DISCLOSURE

A bearing for use in an evacuated space, particularly for use in a rotating anode X-ray tube having balls and races in which the balls can rotate, the balls and races being nitrified to harden the surfaces which are porous. The balls and races are coated with a soft, lubricant metal which is held in the pores of the metal.

---

Figure 1:
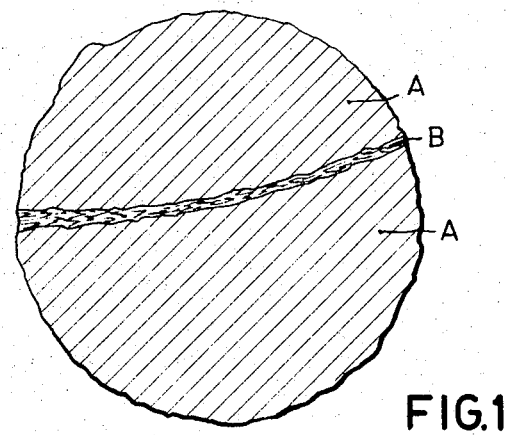

The invention relates to bearings for use in an evacuated space. In particular, the invention relates to ball-bearings for rotary anode X-ray tubes.

Rotary anode X-ray tubes have the disadvantage that it is necessary to avoid oil or grease as a lubricant for the bearings and therefore, in order to facilitate the relative movements of the balls and the races, soft metal is used instead of the lubricants. For this purpose lead and silver have been used principally.

The application of a thin coating of the soft metal to the balls and the races has enabled the use of ball bearings in an exhausted space. However, in rotary anode X-ray tubes, the bearings operate under unfavorable operating conditions due to the frequent temperature variations, and at times this may give rise to difficulties by a less satisfactory operation of the bearings. It has, therefore, been proposed to minimize the duration of the anode rotation. It has been found that the bearings often deteriorate soon due to damage produced by the unfavorable mechanical load on the bearings during the increase of speed of rotation after the rotary anode has been started. In order to reduce the resultant disadvantage, the speed of rotation of the anode can be maintained at a lower speed during the time intervals between two consecutive loadings, or the starting period may be shortened by using a driving member producing a higher torque.

The layer of soft metal on the balls and the races is extremely thin; in view of the clearance in the bearing its thickness usually does not exceed $2\mu$. If the pressure of the balls on the races locally displaces these thin layers, which are thus broken, the hard metals come into contact with each other, which initiates the damage. This is often due to irregular increases in pressure, which mainly occur during the starting period. If the duration thereof is at a minimum, the effect of such pressure differences will be slight, but the forces increase when a higher torque is employed for starting the rotation of hte anode. The repeated collisions between the hard metal balls and the metal of the races may render a ball bearing unserviceable within an unusually short period of time.

The principal object of the invention is to provide an improved ball bearing for use in vacuo.

This and further objects of the invention will appear as this specification progresses.

In accordance with the invention the hard metal balls and races of the bearing are provided with a hardened surface of slightly porous structure before being provided with an extremely thin coating of soft metal. These hardened surfaces can be obtained by the absorption of nitrogen in the material in known manner.

It has been found that after a treatment with nitrogen-containing gaseous or liquid substances at a temperature of about 550° C. for 15 to 20 minutes previously quite smooth metal surfaces are slightly tarnished and have a slight degree of porosity, and that the subsequently applied soft material adheres satisfactorily thereto. It is a further advantage that with the same thickness of the coating a greater quantity of soft metal can be employed without an increase in rolling friction, which would be the case with the same quantity of material on a smooth surface and hence a greater layer thickness.

Figure 2:
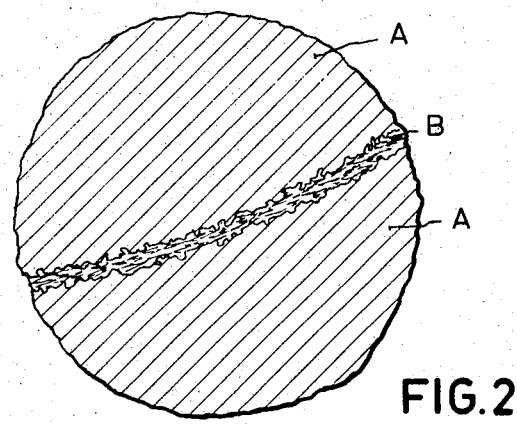

The invention will be described further with reference to the accompanying drawing in which FIG. 1 shows a magnified section of a bearing without pretreatment, and FIG. 2 shows in magnified form the effect of nitrification.

Referring to both figures, A designates the metal of a ball or race and B the soft metal covering the ball or race. FIG. 2 shows the penetration of the soft metal into the substrate, where it is held in the cavities obtained by the nitrogen activity.

The coating is obtained by introducing, as described in U.S. Patent 2,423,880, the soft metal in the form of powder, between the balls and races of the bearing while it is rotated for a period of time sufficient for the formation of the coating.

The invention applies particularly to ball bearings arranged in an evacuated space, the coating consisting of silver. This metal has a greater hardness than lead, which is an advantage in that it is expelled less readily from the path of the balls by the mechanical deformations during operation of the ball bearing. A further advantage of the use of silver resides in the higher melting temperature so that the permissible temperature of the bearing is not as readily exceeded. The less satisfactory adhesion of this metal to a smooth metal surface may be the cause of rupture of the coating in the event of irregular increases in pressure which may occur sooner than with the use of lead. However, this disadvantage of the use of silver is avoided when the balls and races of the bearing have been subjected to the nitrogen treatment.

While the invention has been described in connection with specific examples and applications thereof, other modifications will be apparent to those skilled in the art without departing from the spirit and scope of the invention as defined in the appended claims.

What is claimed is:

1. A bearing for use in an evacuated space, said bearing having balls and races in which the balls can rotate, the balls and races having hardened porous surfaces obtained by nitrification of the material of the balls and races, said balls and races being coated with an extremely thin layer of a soft metal serving as a lubricant.

2. A bearing as claimed in claim 1 in which the soft metal is silver.

References Cited

UNITED STATES PATENTS 2,293,527    8/1942    Atlee _____ 308—241

MARTIN P. SCHWADRON, *Primary Examiner.*

FRANK SUSKO, *Examiner.*